Patented Dec. 9, 1941

2,265,416

UNITED STATES PATENT OFFICE 2,265,416

POLYMERS OF DICYCLIC UREAS

Herbert Bestian, Frankfort-on-the-Main-Unterliederbach, Germany, assignor, by mesne assignments, to General Aniline & Film Corporation, New York, N. Y., a corporation of Delaware No Drawing. Application March 2, 1940, Serial No. 322,032. In Germany February 17, 1939

6 Claims. (Cl. 260—2)

The present invention relates to polymerization products.

In my co-pending U. S. application Serial No. 322,031, of even date, for "Polymerization products" there are described polymerizates containing nitrogen which are obtainable by polymerizing the reaction products of isocyanic acid or of aliphatic, cycloaliphatic and araliphatic monoisocyanates with ethyleneimine or the homologues and derivatives thereof.

Now, I have found on further investigating that field that the reaction products of aliphatic, cycloaliphatic and araliphatic diisocyanates obtainable in an analogous manner, with ethyleneimine or the homologues thereof may likewise be polymerized to plastic materials containing nitrogen. For instance, by the reaction of ethyleneimine or the homologues and derivatives thereof with aliphatic, araliphatic or cycloaliphatic diisocyanates there may, under suitable working conditions, be obtained products of the general formula:

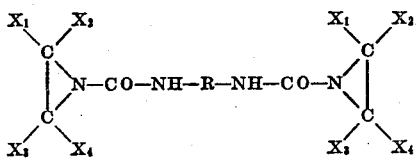

wherein R stands for a substituent of the group consisting of alkylidene, aralkylidene, cycloalkylidene and alkylidenes the chains of which contain hetero atoms, and $X_1$, $X_2$, $X_3$, $X_4$ stand for substituents of the group consisting of hydrogen, alkyl, aryl and aralkyl.

In their monomeric form, these ureas may be isolated in the form of well-crystallized compounds which may, if necessary, be freed from impurities by recrystallization. By polymerization hard, infusible resins clear as glass and water are obtained which are at most sparingly soluble, in most cases, however, insoluble in all solvents, such as hydrocarbons, alcohols, hydrocarbon halides, ethers, ketones, esters as well as in dilute and concentrated acids and lyes.

The di-ureas of the above-named constitution used as starting material for the polymerization are, in contradistinction to most of the monoureas of my U. S. application named above readily soluble in water. This property renders the said starting material applicable on a large scale.

The polymerization products obtained differ from the polymerization products from N.N-ethylene-monoureas by their net-like structure which causes them to be infusible, very hard and sparingly soluble.

The capability of being readily polymerizable of the reaction products of aliphatic or araliphatic diisocyanates with ethyleneimine or the homologues thereof, in particular of the ureas illustrated by the above formula, makes it possible to use said products for a great many purposes, especially as plastic materials.

As starting substances there may, for instance, be used compounds the radical —R— of which has the following constitution: —$CH_2$—, —$CH_2$—$CH_2$—, —$(CH_2)_3$—, —$(CH_2)_4$—, —$(CH_2)_5$—; the radical may likewise be branched, for instance

—$CH_2$—$CH$—$CH_2$—$CH_2$—
　　　　$|$
　　　　$CH_3$

—$CH$—, —$CH$—
　$|$　　　$|$
　$C_6H_5$　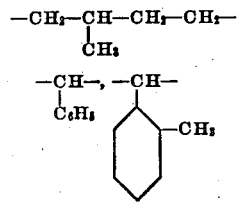

as well as the corresponding meta- and para-compounds,

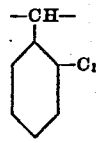

as well as the corresponding meta- and para-compounds and bromine compounds,

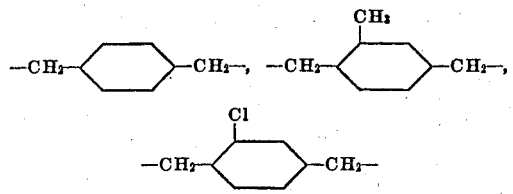

as well as the corresponding bromine compound;

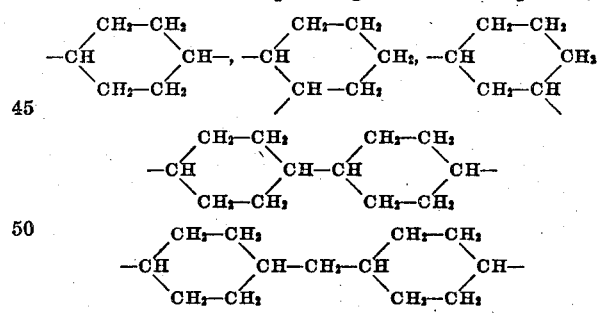

The radical —R— may likewise be interrupted by hetero atoms, for instance:

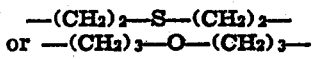

The hydrogen atoms of the ethylene groups may partly or entirely be substituted by methyl, ethyl, propyl, isopropyl, butyl, isobutyl, amyl, isoamyl, decyl, furthermore by phenyl, the methyl-phenyl radicals, benzyl and ortho-, meta- and para-tolyl. Two, three or all of the four hydrogen atoms may likewise be substituted by two, three or four different substituents as named above.

The polymerization is preferably carried out by suitably heating the products to temperatures above the melting point of the pure monomeric compounds. A test portion shows without difficulty the termination of the polymerization. The polymerization may be accelerated by the addition of catalysts. Thereby the polymerization takes place already at room temperature. As such catalysts there are preferably used: acid substances such as hydrochloric acid, sulfuric acid, phosphoric acid, acetic acid, tartaric acid, benzene sulfonic acid, toluene sulfonic acid, sulfur dioxide, carbon dioxide, sodium bisulfate and potassium bisulfate, aluminium chloride.

There may likewise be polymerized mixtures of the above-named starting substances; interpolymerization products are thereby obtained. The polymerization may, furthermore, likewise be carried out in the presence of solvents like water, ethyl alcohol, propyl alcohol, isopropyl alcohol, butyl alcohol, isobutyl alcohol and other alcohols. Finally, the polymerization may also take place in an aqueous dispersion, the water-insoluble final products being especially suitable therefor.

The following examples serve to illustrate the invention, but they are not intended to limit it thereto:

1. By reacting in an acetone solution 1.8-octamethylene-diisocyanate with ethyleneimine the following dicyclic urea is obtained:

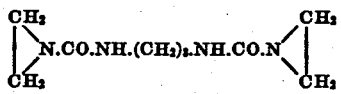

The compound melts at 101° C. and is very readily soluble in warm water. When heating the aqueous solution for several hours to 100° C., an insoluble and infusible polyurea separates which has been formed by polymerization. By cautiously melting the monomeric urea and heating the melt for several hours to 110° C. to 120° C., a hard, strongly light-refracting resin clear as glass is obtained.

2. The dicyclic urea of the formula:

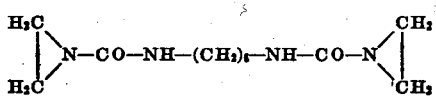

obtainable by reacting in an acetone solution 1.6-hexamethylene-diisocyanate with ethyleneimine is melted by cautiously heating to 110° C. As soon as the melt has become as clear as water the temperature is, within half an hour, lowered to 90° C. The temperature is kept for 24 hours at 90° C., the melt being stirred for as long a time as the viscosity of the melt allows it. After 2 to 3 hours the melt begins to solidify. An infusible resin clear as water and hard as glass is obtained which is insoluble in water and in all organic solvents and which shows a combined resistance to bending and impact which is far greater than that of polystyrene.

3. The dicyclic urea of the formula:

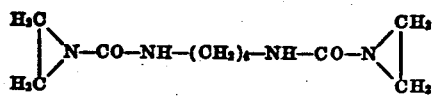

prepared by reacting in an acetone solution 1.4-tetramethylene-diisocyanate with ethyleneimine is melted by cautiously heating to 125° C. As soon as the melt is clear, the melting temperature is slowly reduced to 85° C. and heating is continued for 24 hours. At the beginning of the polymerization a mechanical stirring of the melt is necessary, for else the temperature within the melt rises too much owing to the strong heat produced by polymerization. Already after heating for 1 to 2 hours the melt begins to solidify. A resin clear as water and hard as glass is obtained. Its softening point according to Vicat lies at 126° C.

4. A magma is prepared from an equivalent amount each of the dicyclic urea mentioned in Example 2 and water.

By heating it to 50° C.–60° C. the magma is dissolved to a clear solution, the viscosity of which rapidly increases by heating to 90° C., owing to the setting in of the polymerization of the urea. After heating for 10 minutes a solution is obtained which becomes viscous in the cold; this solution contains the dicyclic urea in a moderately polymerized form. Instead of water butanol may likewise be used as solvent. In the latter case the magma must, however, be heated for about 2 hours at 90° C.

5. A solution containing 10 per cent. of the dicyclic urea mentioned in Example 2 is adjusted to a pH value of 5.5 by means of sodium acetate and acetic acid. After several hours, separation of the polymeric urea begins, said separation being finished after about 1 to 2 days. The polymeric urea separated in the form of flakes is filtered with suction, washed with water and dried at 80° C. in the drying chamber. The dried powder can be moulded into a plastic material with application of pressure and heat.

6. Equal parts of the ureas mentioned in Examples 2 and 3 are cautiously melted together at 110° C. As soon as the melt has become clear the temperature is lowered in the course of ¾ hour to 90° C., and the melt is then further heated for 24 hours at this temperature. An infusible plastic material clear as water is obtained which has an excellent tensile strength.

Instead of using in the above mixture equal parts of the two monomers the one or the other monomer may likewise be applied in an enlarged quantity, since the polymerization takes place with any proportion of mixture applied. In a corresponding manner there may likewise be polymerized mixtures of the other monomers enumerated above.

I claim:

1. Polymerization products of compounds of the following formula:

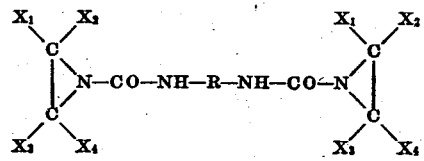

wherein R stands for a substituent of the group consisting of alkylene, aralkylene, cycloalkylene and alkylenes the chains of which contain hetero atoms, and $X_1$, $X_2$, $X_3$, $X_4$ stand for substituents of the group consisting of hydrogen, alkyl, aryl and aralkyl, said products being clear, colorless, solid, hard resins which are at most sparingly soluble in solvents and not thermoplastic.

2. Polymerization products of compounds of the following formula:

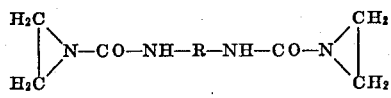

wherein R stands for a substituent of the group consisting of alkylene, aralkylene, cycloalkylene and alkylenes the chains of which contain hetero atoms, said products being clear, colorless, solid, hard resins which are at most sparingly soluble in solvents and not thermoplastic.

3. Polymerization products of compounds of the following formula:

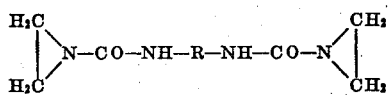

wherein R stands for an alkylene radical, said products being clear, colorless, solid, hard resins which are at most sparingly soluble in solvents and not thermoplastic.

4. Polymerization products of compounds of the following formula:

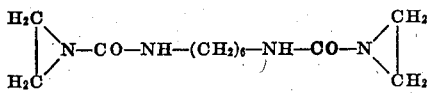

said products being clear, colorless, infusible resins insoluble in water and organic solvents.

5. Polymerization products of compounds of the following formula:

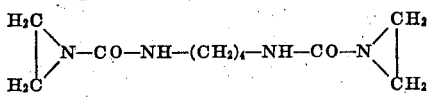

said products being clear, colorless, hard resins.

6. Polymerization products of mixtures of compounds of the following formula:

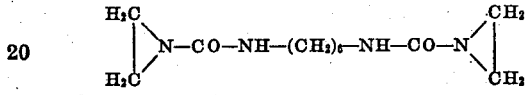

and

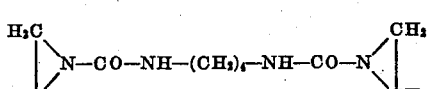

said products being clear, colorless, hard resins.

HERBERT BESTIAN.